United States Patent [19]
van der Lely

[11] Patent Number: 5,865,138
[45] Date of Patent: Feb. 2, 1999

[54] METHOD AND APPARATUS FOR AUTOMATICALLY MILKING ANIMALS, SUCH AS COWS

[76] Inventor: Cornelis van der Lely, 7 Brüschenrain, CH-6300 Zug, Switzerland

[21] Appl. No.: 658,176

[22] Filed: Jun. 4, 1996

Related U.S. Application Data

[63] Continuation of PCT/NL95/00343 Oct. 9, 1995 published as WO96/11568 Apr. 25, 1996.

[30] Foreign Application Priority Data

Oct. 12, 1994 [NL] Netherlands ......................... 9401681

[51] Int. Cl.$^6$ ........................................................ A01J 3/00
[52] U.S. Cl. ................................... 119/14.02; 119/14.18; 119/14.08
[58] Field of Search ............................. 119/14.02, 14.01, 119/14.08, 14.14, 14.18, 14.1, 14.11

[56] References Cited

U.S. PATENT DOCUMENTS

| | | | |
|---|---|---|---|
| 2,558,628 | 6/1951 | Redin | 134/95 |
| 2,624,355 | 1/1953 | Buchinger | 134/168 |
| 3,012,566 | 12/1961 | Baker | 134/152 |
| 4,344,385 | 8/1982 | Swanson et al. | 119/14.08 |
| 4,838,207 | 6/1989 | Bom et al. | 119/14.02 |
| 5,042,428 | 8/1991 | Van Der Lely et al. | 119/14.08 |
| 5,052,341 | 10/1991 | Woolford et al. | 119/14.02 |
| 5,390,627 | 2/1995 | Van Der Berg et al. | 119/14.08 |
| 5,606,932 | 3/1997 | Van Der Lely | 119/14.14 |
| 5,651,329 | 7/1997 | Van Den Berg et al. | 119/14.02 |

FOREIGN PATENT DOCUMENTS

| | | |
|---|---|---|
| 0 222 574 A3 | 5/1987 | European Pat. Off. . |
| 0 536 836 A1 | 4/1993 | European Pat. Off. . |
| 0 574 089 A2 | 12/1993 | European Pat. Off. . |
| 8602505 | 5/1988 | Netherlands . |

OTHER PUBLICATIONS

International Search Report (PCT) for Netherlands Patent Application No. 9401681, filed Oct. 12, 1994, which is in Dutch.

Annex to Form PCT/ISA/206 for International Application No. PCT/NL 95/00343.

*Primary Examiner*—Edgar Burr
*Assistant Examiner*—Dave A. Ghatt
*Attorney, Agent, or Firm*—Penrose Lucas Albright

[57] ABSTRACT

A system for automatically milking animals, such as cows, by a milking robot which emplaces teat cups on the teats of the animal, wherein the milking of the animal commences for a predetermined short length of time or for a short period of time that it takes for a sensor to determine that foremilking of the animal has been completed. The foremilk is diverted from the milking conduit and the teat cups are removed, cleaned and replaced on the teats of the animal following foremilking, after which the conventional automatic milking of the animal is completed.

30 Claims, 4 Drawing Sheets

METHOD AND APPARATUS FOR AUTOMATICALLY MILKING ANIMALS, SUCH AS COWS

This is a continuation of PCT/NL95/00343 filed Oct. 9, 1995.

FIELD OF THE INVENTION

The present invention relates to a method of milking animals, such as cows, whereby, by means of a milking robot, at least one teat cup is connected to a teat of an animal to be milked. More particularly, it relates to an automatic milking system wherein foremilk is not mixed with the milk intended for consumption otherwise withdrawn from the animal's teats.

BACKGROUND OF THE INVENTION

In the process of automatically milking animals, the foremilk obtained with the teat cups, i.e. the squirts of milk first drawn from the animal's teat into the teat cup, are generally mixed with milk left in the animal's teat from the previous milking and this old milk is jointly stored with fresh milk in a milk tank. It is generally known that the foremilk of some animals can have a high germ count. Mixing the foremilk with the fresh milk is thus undesirable because it results eventually in milk of a lower quality.

SUMMARY OF THE INVENTION

The present invention has for its objective to obtain in an automatic milking system milk of high purity and quality.

According to the invention, this is achieved through a method by which, after foremilking, the teat cup is cleaned. Thus, after foremilking, the teat cup is disconnected and cleaned, and then reconnected to the teat and the corresponding udder quarter is milked out, after which the teat cup is cleaned again. In particular, the reconnection of the teat cup to the teat, according to the invention, is accomplished by a milking robot; after milking out the relevant udder quarter, the teat cup is preferably cleaned again before it is connected anew to a teat by means of the milking robot. Owing to the fact that by the above method the teat cups, and possibly the milk lines, are purged of the remnants of foremilk, it is prevented that any mixture of foremilk with the milk obtained subsequently takes place, which increases the purity, and, consequently, the quality of the milk suitable for consumption. Owing to the fact that upon milking out the udder quarter, i.e. upon completion of the milking, the teat cup is first cleaned before it is connected to a different teat, it is prevented that remnants of milk from one animal come into contact with the teats of any other animal; for this could cause diseases that are carried from one animal to the other. According to the invention, each teat cup is cleaned immediately upon termination of the milking, whereupon the remnants of milk of the relevant milking are also prevented from decaying and subsequently contacting the teats of a next animal to be milked. Further, according to the invention, a method is adopted, by which the foremilk and the milk which is mixed therewith on one hand and milk otherwise suitable for consumption on the other are discharged into separate tanks.

The invention further relates to an apparatus for milking animals, such as cows, comprising one or a plurality of milking robots, characterized in that the apparatus is designed so that during the milking process a teat cup is cleaned at least twice. In this manner, cleanliness of the teat cup and high purity of the milk are assured, and remnants of the foremilk are prevented from mixing with the milk suitable for consumption which is subsequently obtained. According to a further feature of the invention, the cleaning implement comprises teat cup cleaners which are connectable to a teat cup by means of a cylinder/piston unit. According to still another feature of the invention, the teat cup cleaners are disposed so as to be vertically movable near a side of the milking parlor.

According to yet another aspect of the invention, the apparatus comprises a mechanism for foremilking, whereby the first few squirts of foremilk are discharged into a separate reservoir which is isolated from the milk suitable for consumption. Accordingly, the invention also relates to an apparatus for milking animals, such as cows, comprising one or more milking robots and a computer, characterized in that the apparatus comprises a mechanism for foremilking, whereby the first few squirts of foremilk are discharged into a separate reservoir which is segregated from the milk suitable for consumption. For the purpose of discharging the foremilk separately, according to another feature of the invention, the foremilking mechanism comprises a computer-controlled three-way cock, by means of which the teat cup can be connected to a separate reservoir for the storage of foremilk. To prevent the milk tube, through which the milk suitable for consumption is discharged, from being contaminated with the foremilk, the three-way cock is disposed on or near the teat cup, according to a feature of the invention. For the purpose of switching the three-way cock, according to a further feature of the invention, the foremilking mechanism comprises a timing circuit which defines a time interval for obtaining the foremilk, or a sensor, such as a flow sensor, or both, by means of which it can be established whether a few squirts of foremilk have been obtained through the teat cup. In order to discharge the foremilk and the milk suitable for consumption separately, the apparatus according to the invention comprises a foremilking mechanism including a teat cup provided with at least two milk lines, one of them for the discharge of foremilk.

According to a further feature of the invention, the apparatus comprises a holder on which the teat cups are arranged after a milking which holder is provided with a recess which is preferably conical and corresponds with the shape of the underside of a teat cup. According to still another feature of the invention, a teat cup is provided with means of transport, with the aid of which the teat cup during motion is kept in an approximately upright position, which means of transport comprise at least two cables connected to the teat cups. It is thus achieved that the upper end of the teat cup will not easily contact the floor of the milking parlor, whereby the end of the teat cup which receives the animal's teat remains clean which, in turn, is conducive to milk of a higher quality. According to another feature of the invention, one cable, which extends essentially vertically, is connected to the milking parlor and the other cable extends essentially horizontally and transversely to the longitudinal direction of the milking parlor. According to a yet further feature of the invention, the means of transport are provided with a withdrawing member which is disposed near a longitudinal side of the milking parlor and which comprises a cylinder/piston arrangement connected to the end of the cable extending essentially horizontally. According to still another feature of the invention, near each longitudinal side of the milking parlor there are provided two preferably pneumatic cylinder/piston units extending in the longitudinal direction of the milking parlor. In order to meet with the least possible resistance from the milk and pulsation tubes during the movements of the teat cups, according to another feature of the invention, a teat cup is provided with milk or pulsation tubes, or both, which are pivot-mounted near the upper side of the milking parlor. Accordingly, the invention also relates to an apparatus for milking animals, such as cows, comprising one or more milking robots, one or more milking parlors, a computer and teat cups, characterized in that milk and/or pulsation tubes of the teat cup are pivot-mounted near the upper side of the milking parlor. According to this feature of the invention, the hinge construction, by means of which the milk and/or pulsation tubes are pivot-mounted on the milking parlor, is disposed at a certain distance from the longitudinal side of the milking parlor. According to still another feature of the invention, the milk and/or pulsation tubes are disposed in an angular configuration or shape of an isosceles triangle. According to a further feature of the invention, the pulsation tube is placed along one leg of the isosceles triangle and the milk tube or tubes along the other leg.

According to another aspect of the invention, the milking robot is provided with at least two robot arms each equipped with a gripper, by means of which the teat cups are capable of being coupled to the teats of an animal to be milked. According to a further feature of the invention, the gripper is provided with a recess curved in accordance with the shell of a teat cup and the gripper comprises an electromagnet. According to yet another feature of the invention, a robot arm is disposed on each side of the milking parlor to increase the speed of coupling. The apparatus according to the invention comprises a robot arm provided with a detector, such as a laser sensor, to determine the positions of the teats of an animal to be milked. According to a further feature of the invention, the robot arm provided with the detector is disposed on a longitudinal side of the milking parlor and the robot arm is movable in height.

BRIEF DESCRIPTION OF THE DRAWINGS

The invention will now be further explained with reference to the accompanying drawings, in which.

DESCRIPTION OF THE PREFERRED EMBODIMENTS

Figure 1:
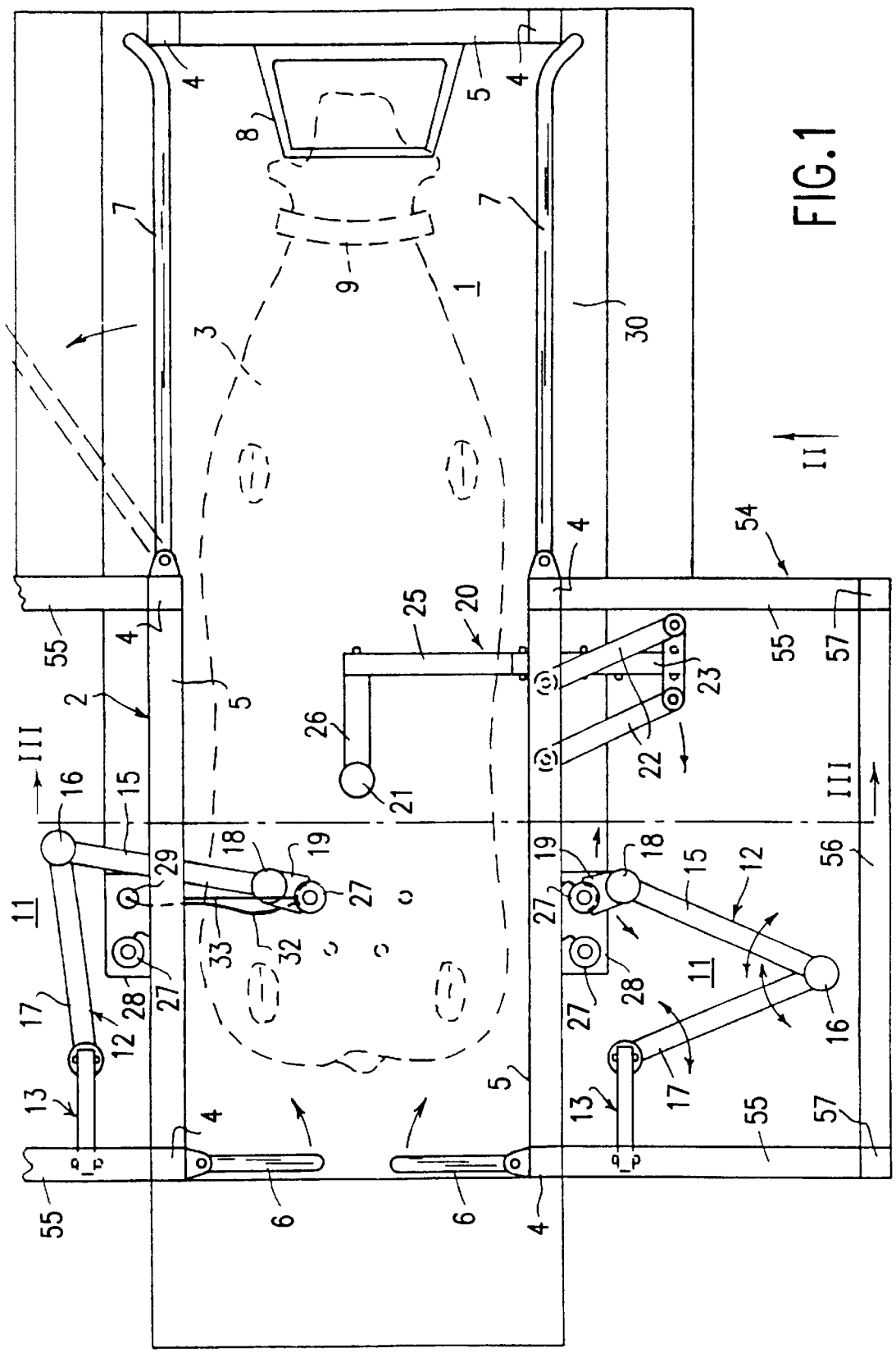
FIG. 1 is a plan view of an apparatus for milking animals, which apparatus is provided with a milking robot having on each longitudinal side a robot arm and a gripper for grasping the teat cups.
Figure 2:
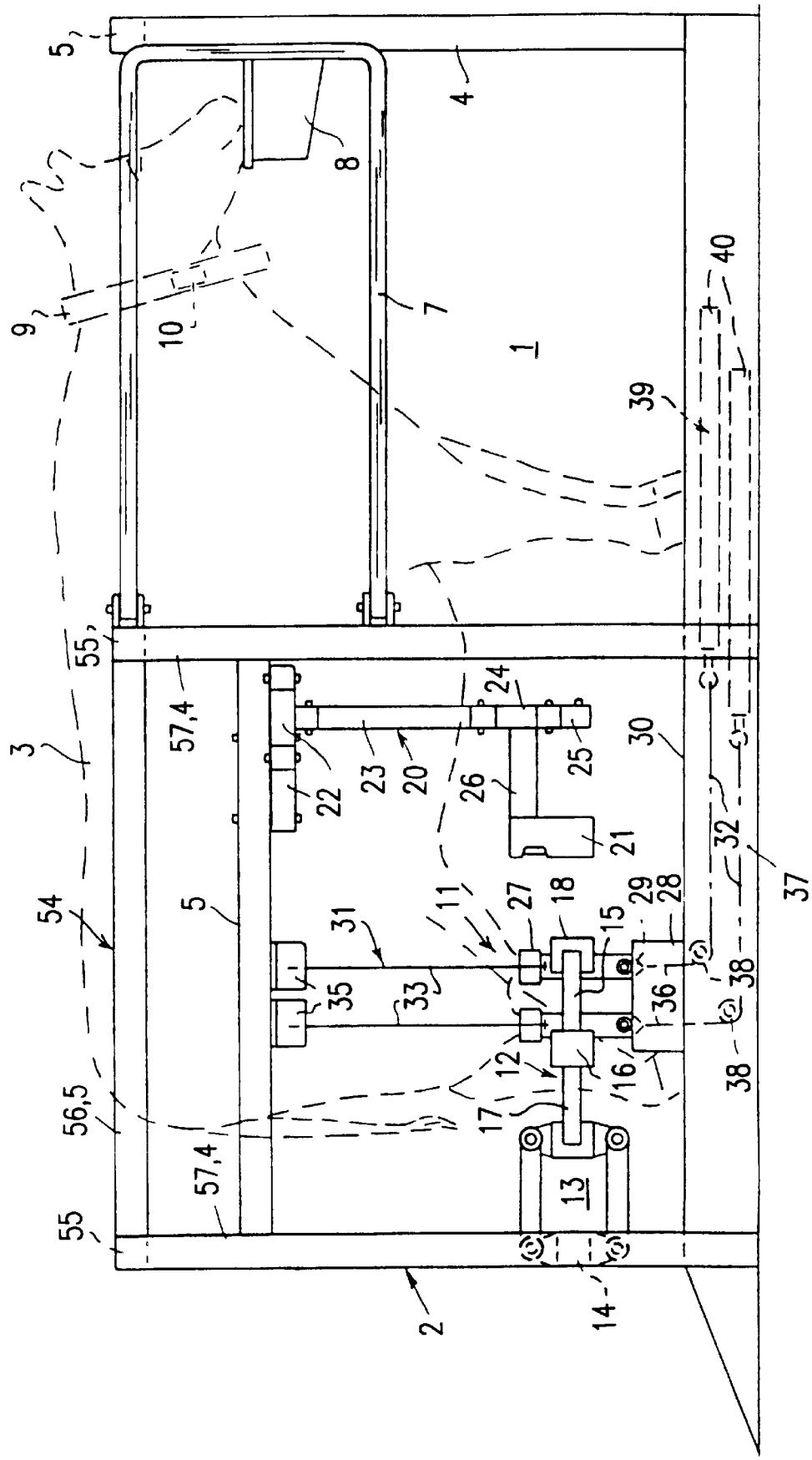
FIG. 2 is a side elevational view of the apparatus for milking animals according to FIG. 1, wherein the means of transport for keeping the teat cups during travel in an upright attitude are clearly discernible.
Figure 3:
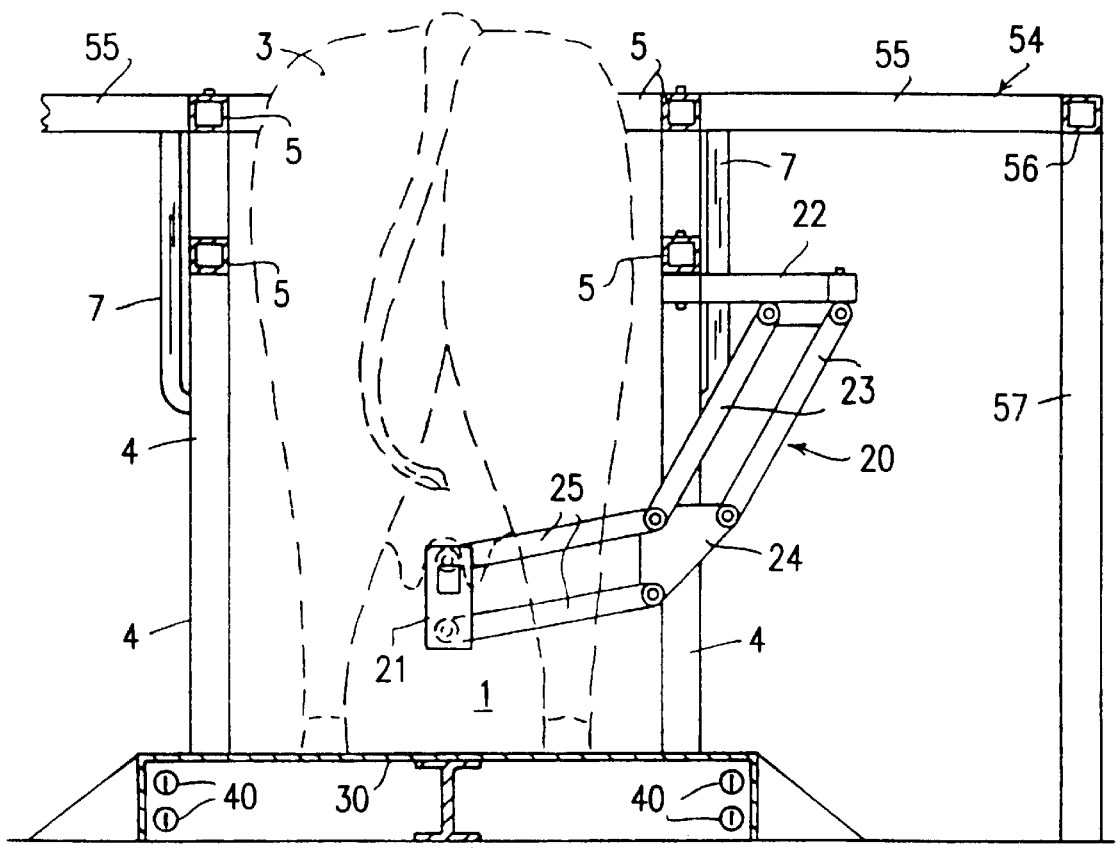
FIG. 3 is a rear elevational view of the milking parlor taken on line III—III in FIG. 1.

FIG. 1 shows a plan view of a milking parlor 1 with a frame 2 enclosing an animal 3, a cow in the present case, as illustrated in the Figures by dashed lines. As depicted in FIGS. 1 and 2, frame 2 comprises posts 4 and, between the rear posts 4 and the central posts 4, cross beams 5 are placed at a certain distance from and parallel to each other. Milking parlor 1 is provided with entrance gates 6 on the rear side and exit gateways 7, one on each of the two longitudinal sides. Upon opening, gateways 7 may connect milking parlor 1 with the same area or separate areas such as an isolation room on one side and the cowhouse on the other side. On a cross beam 5 of frame 2 near the front of milking parlor 1 a feed trough 8 is provided, wherein animal 3 can be given food concentrates. For identification of animal 3, around its neck is provided a collar 9 with a transmitter 10 that operates in conjunction with a cow recognition system (not shown).

In the vicinity of milking parlor 1 there is furthermore provided a milking robot denoted generally by reference numeral 11, which comprises a robot arm 12 on each longitudinal side of milking parlor 1. Each robot arm 12 is via a support 14 connected with a rear post 4 by means of a parallelogram-type hinged arm construction 13. Supports 14 are disposed transversely to a longitudinal direction of milking parlor 1 from rear posts 4. Robot arm 12 is capable of being moved vertically by means of a cylinder/piston arrangement (not shown). Robot arm 12 comprises a first arm part 15 and a second arm part 17 capable of pivoting about a vertical shaft 16. On the end of first arm part 15 there is provided a gripper 19 capable of rotating about a vertical shaft 18. On one longitudinal side of milking parlor 1 generally forward of arm 12 is provided a further robot arm 20 equipped with a detector 21 for finding the teat positions of animal 3. Further robot arm 20 comprises a first parallelogram-type hinged arm construction 22 which is in a virtually horizontal position and which has one end connected with a cross beam 5 of frame 2 of milking parlor 1 (FIG. 1). Approximately perpendicular to the first horizontal parallelogram-type hinged arm construction 22 there is provided a second parallelogram-type hinged arm construction 23 extending in a downward direction and situated in a vertical plane. The other end of the second vertical parallelogram-type hinged arm construction 23 is connected with a triangular plate 24. Connected to a different side of triangular plate 24 is a third parallelogram-type hinged arm construction 25, the arms of which extend essentially horizontally and are situated in a vertical plane which is perpendicular to the milking parlor 1. On the inboard end of the third parallelogram-type hinged arm construction 25 there is provided a support 26, which is parallel to the longitudinal direction of milking parlor 1 and to which detector 21 is attached. In the present exemplary embodiment of the invention, detector 21 comprises a laser. The first, second and third parallelogram-type hinged arm construction are capable of being operated by preferably pneumatic cylinder/piston arrangements (not shown).

Further, milking robot 11 is equipped with four teat cups 27, which are arranged on two teat cup holders 28, one being provided on each side of milking parlor 1 (FIG. 1). Each teat cup carrier or holder 28 is provided with a conical seating 29 corresponding with the lowermost conical part of each teat cup 27. Accordingly, in the present exemplary embodiment, on the two longitudinal sides of milking parlor 1, respective holders 28, each having two conical recesses or seatings 29 situated one behind the other, are provided on the milking parlor floor 30.

Figure 4:
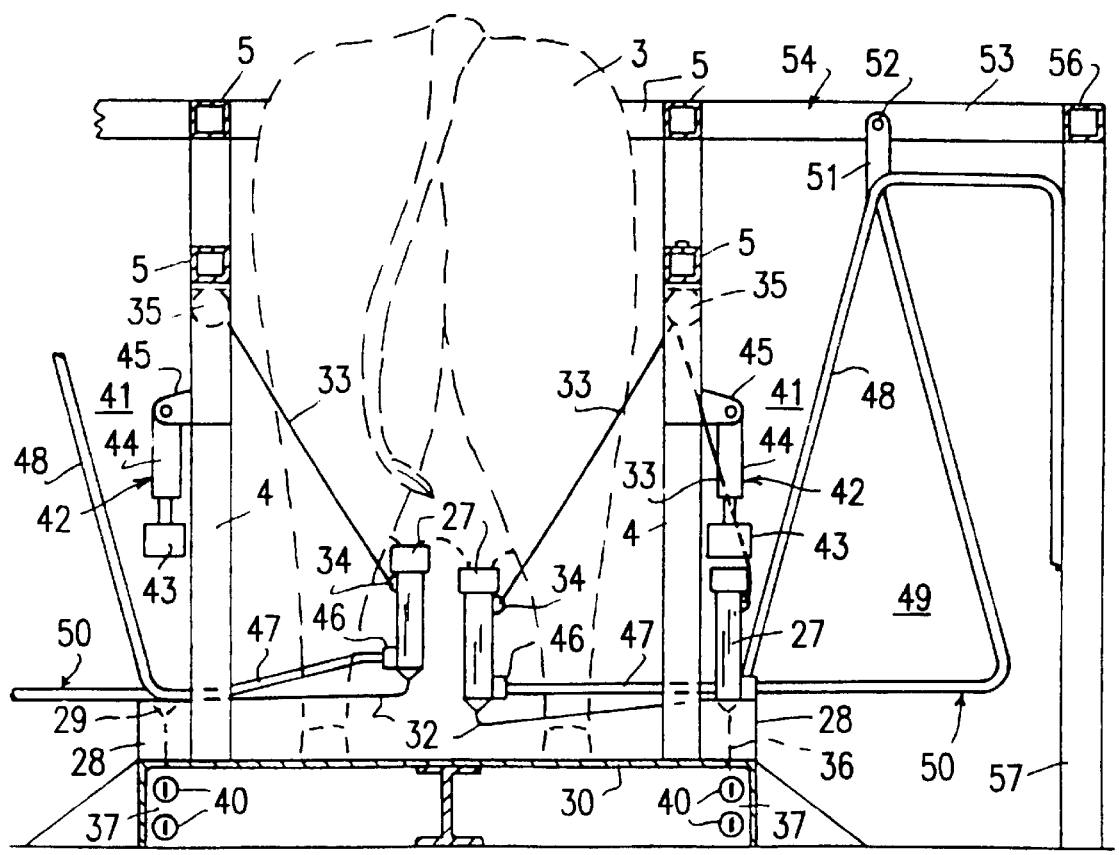
FIG. 4 also is a rear elevational view of the milking parlor in operation showing the teat cup cleaners and the pivot-mounted milk and pulsation tubes.

Each teat cup 27 is further provided with means of transport which is indicated generally by reference numeral 31, with the aid of which each respective teat cup 27 is kept continuously or virtually continuously in an approximately vertical position during its movement to teat cup holder 28 and during disconnection from its corresponding teat. Each means of transport 31 comprises, as shown in FIG. 4, a cable 32 extending essentially horizontally and a cable 33 extending essentially vertically. Each vertical cable 33 has one end connected with a cable fastening 34, which is disposed near the top side on the shell of the corresponding teat cup 27.

The other end of each vertical cable 33 is connected with a separate cable fastening 35, which is disposed on a cross beam 5 of frame 2. Each cable fastening 35 is a cylindrical body, which also constitutes a guide for the end of the corresponding vertical cable 33. The length of the vertical cable 33 is dimensioned so the upper part of the teat cup 27 cannot contact floor 30 of milking parlor 1. In the conical part on the underside of each teat cup 27 there is provided a cable fastening, by means of which one end of the horizontal cable 32 is connected therewith. As is shown in FIG. 2, each horizontal cable 32 passes through a hole in a corresponding recess of the teat cup holder 28. Each hole receives a first vertical part 36 of cable 32 leading from the center of the corresponding conical seating 29 and perpendicular thereto, a second part 37 of each cable 32 extends forwardly relative to milking parlor 1. In the transition between vertical part 36 and horizontal part 37 of each cable 32 a roller member 38 is provided, which supports the corresponding horizontal cable 32. The two horizontal cables 32 of each pair of teat cups 27 depend downwardly from teat cup holder 28 and they extend approximately parallel to each other in the longitudinal forward direction of milking parlor 1 to the withdrawing members 39. In the present exemplary embodiment of the invention, withdrawing members 39 are pneumatically actuated cylinder/piston units, but they may also be hydraulically actuated cylinder/piston units or electric equivalents of cylinder/piston units. On each longitudinal side of milking parlor 1, in the exemplary embodiment of the invention, there are thus provided two pneumatically actuated cylinder/piston units 40, one above the other and parallel to each other. The end of each piston rod of each pneumatically actuated cylinder/piston unit 40 comprises a cable fastening, to which the corresponding horizontal cable 32 is attached (FIG. 2).

Milking parlor 1 of the present exemplary embodiment of the invention is also provided with cleaning implements which are designated generally by reference numeral 41 for cleaning teat cups 27. Each cleaning implement 41 comprises a pair of two teat cup cleaners 42, disposed on either side of milking parlor 1. Each teat cup cleaner 42 comprises a spray head 43 placed on the piston rod of a pneumatic cylinder 44, which cylinder 44 has its other end connected with frame 2 of milking parlor 1 through a lug 45. The pneumatic cylinder 44 is capable of being operated by a computer (not shown), the arrangement being such that each spray head 43 is associated with a respective teat cup 27, which is located on the relevant teat cup holder 28 during a condition of rest. A cleaning or disinfecting liquid or combination of both can be sprayed into or along each teat cup 27 by the corresponding spray head 43.

Teat cups 27 are each further provided at its lower aspect with a computer-controlled three-way cock 46, to which for each teat cup 27 two lines 47 for the discharge of milk are connected. Each teat cup 27 further comprises a pulsation tube 48. The milk lines 47 and the pulsation tube 48 extend virtually horizontally from a teat cup 27 to the nearest side of milking parlor 1. Just outside of milking parlor 1, milk lines 47 and pulsation tube 48 bend upwards so that the tubes form a triangle designated by reference numeral 49, such as an isosceles triangle. In the present exemplary embodiment, isosceles triangle 49 is thus formed by arranging milk lines 47 and pulsation line 48 in angular configurations 50 contoured into the shape of an isosceles triangle 49 as seen in FIG. 4. The angular configuration 50 is supported at its upper apex by a strip 51, which at its other end is hinged to swing on a horizontal pivot 52 disposed in the longitudinal direction of milking parlor 1. Strip 51 is mounted on a beam 53 which, in turn, is mounted from and to extend perpendicularly from cross beam 5 of frame 2. Beam 53 is part of a generally U-shaped secondary framework 54, which is connected with frame 2 of milking parlor 1. As depicted in FIG. 1, the U-shaped secondary framework 54 comprises two beams 55 mounted on to extend perpendicularly from posts 4 and interconnected by means of a cross beam 56 on the other end. Beams 55 and cross beam 56 are supported at their outer aspects by two vertical posts 57. The U-shaped secondary frameworks 54 extend forwardly from gates 6 to approximately gateways 7.

The operation of apparatus for milking animals as set forth above is as follows:

After an animal 3 has entered milking parlor 1 through gates 6, animal 3 is automatically identified by the cow recognition system by means of transmitter 10. After animal 3 has been so identified by the cow recognition system, a quantity of food concentrates may be supplied to animal 3 in feed trough 8. Subsequently, by means of a computer (not shown), robot arm 20 with laser detector 21 thereon is swung to underneath animal 3 and, by means of laser detector 21, the positions of the teats of animal 3 are determined and relayed to the computer. Then the computer issues one or more signals to the two robot arms 12 which are disposed on the longitudinal sides of milking parlor 1 and which, acting on the basis of these signals, place each of grippers 19 with their curved recesses close to a shell of a corresponding teat cup 27. In the present exemplary embodiment of the invention, first, the teat cups 27 which are to be connected to the hind teats of animal 3 to be milked are engaged. Even before the curved recess of a gripper 19 comes near to the shell of a relevant teat cup 27, the computer issues a signal to the electromagnet of the gripper 19 so as to produce a magnetic field in the vicinity of the curved recess of gripper 19. When gripper 19 has sufficiently approached the metal shell of the relevant teat cup 27, that teat cup 27 is drawn firmly against the curved recess of gripper 19 owing to the presence of its magnetic field. A change in the magnetic field occurs as gripper 19 engages the metal shell, whereupon a signal is issued to the computer, signifying that the relevant teat cup 27 has been coupled. The last-mentioned signal can also be issued by a different type of sensor, such as a contact sensor which is disposed in gripper 19, or by means of a position determination through the detector 21.

The computer then issues a signal to the means of transport 31 of the relevant teat cup 27, which means releases tension on the corresponding cable 32 caused by the respective pneumatically actuated cylinder/piston unit 40, the arrangement being such that teat cup 27 can be lifted from its conical seating 29 of relevant teat cup holder 28 by means of robot arm 12 without being held back by the horizontal cable 32. Subsequently, the relevant teat cup 27 is moved horizontally to underneath a hind teat of animal 3. When this teat cup 27 is moving to such teat, the vertical cable 33 swings along with the teat cup 27 and the horizontal cable 32 is also pulled along. By means of gripper 19, teat cup 27 is then connected to the teat of an animal 3 to be milked. Even before the commencement of foremilking, the computer issues a signal to the computer-controlled three-way cock 46, as a result of which the relevant teat cup 27 is put into communication with the milk line 47 for the discharge of foremilk. The foremilk is discharged into a tank (not shown) via milk line 47. After it has been established by means of a flow sensor that a predetermined number of squirts of foremilk has been received by teat cup 27, the foremilking is interrupted and the relevant teat cup 27 is disconnected and moved towards teat cup holder 28 with the aid of the means of transport 31. When such teat cup 27 has been drawn into conical seating 29, the computer issues a signal to cleaning implement 41, whereupon the pneumatic cylinder/piston unit 44 is energized and spray head 43 is connected to teat cup 27, whereupon cleaning of teat cup 27 and optionally milk line 47 is commenced. After teat cup 27 has been cleaned, the computer issues a signal to the computer-controlled three-way cock 46 so as to connect the teat cup to the milk line 47 used for the discharge of the milk suitable for consumption. Subsequently, the teat cup is connected in the aforementioned manner to the teat of the animal 3 to be milked by means of robot arm 12, whereupon the milking process is begun. After it has been established by means of a flow sensor that an udder quarter is empty, teat cup 27 is disengaged from the animal's teat and is drawn back to its teat cup holder 28 by means of transport 31. After this, the computer again issues a signal so that teat cup cleaner 42 again cleans the relevant teat cup 27 before it is connected again to a teat of an animal to be milked. Accordingly, the invention comprises an apparatus for milking animals, such as cows, using one or more milking robots, one or more milking parlors, a computer and a cleaning implement for cleaning the teat cups, characterized in that, after a teat cup has been connected to a teat and foremilking has taken place for a certain duration of time, the computer issues a first signal to a cleaning device for the cleaning implement to be cleaned. The computer issues a second signal when the milking process for the relevant teat cup terminates, whereupon the relevant teat cup is cleaned again. In another exemplary embodiment of the invention, it is possible that the arrangement for foremilking comprises a timing device included in the computer, which timing device defines a time interval for obtaining the foremilk. Owing to the fact that the milk tubes 47 and the pulsation tubes 48 are hinge-mounted, the animal 3 can freely move in the milking parlor 1 when teat cups 27 are connected and during the milking process including the foremilking without risking that a teat cup 27 is undesiredly uncoupled from the teat by reason of the animal's movements. Although the preferred embodiments of the invention are described above, it is to be understood that it is capable of other adaptations and modifications within the scope of the following claims.

Having disclosed my invention, what I claim as new and to be secured by Letters Patent of the United States of America is:

1. A method of automatically milking animals, such as cows, which comprises the steps of sequentially connecting a teat cup to a teat of an animal to be milked, foremilking said teat by said teat cup so as to discharge foremilk from said teat removing said teat cup from said teat when said foremilk is substantially discharged therefrom, cleaning said teat cup, reconnecting said teat cup to said teat, and completing the milking of the udder quarter from which said teat depends.

2. A method according to claim 1, wherein after said udder quarter is milked out, said teat cup is again cleaned.

3. A method according to claim 2, wherein said teat cup is cleaned immediately upon termination of the milking.

4. A method according to claim 1 wherein said foremilk and the subsequent milk received in said teat cup which is suitable for consumption are separately discharged from said teat cup into separate tanks.

5. An apparatus for automatically milking animals, such as cows, comprising a milking robot, a teat cup connected to said milking robot, cleaning means for cleaning said teat cup, control means associated with said milking robot (a) for causing said milking robot to remove said teat cup from a said animal's teat when foremilking of said teat is completed, (b) for causing said cleaning means to clean said teat cup immediately after completion of said foremilking, and (c) then causing said teat cup to be replaced by said milking robot on said teat to complete the milking of the udder quarter from which said teat depends, said control means further causing said milking robot again to remove said teat cup when said milking quarter is milked out and said cleaning means again to clean said teat cup, whereby said teat cup is cleaned at least twice during said animal's milking turn.

6. An apparatus according to claim 5, wherein said cleaning means comprising a cylinder/piston unit for connecting said cleaning means to teat cup.

7. An apparatus according to claim 6, including a milking parlor, said cleaning means being disposed so as to be vertically movable near the side of said milking parlor.

8. An apparatus according to claim 5 wherein said control means is associated with sensor means on said teat cup, said sensor means transmitting data to said control means of streams received in said teat cup during foremilking, a discharge conduit connected to said teat cup to conduct the first few streams of foremilk into a reservoir separate from another reservoir into which the milk subsequently received in said teat cup that is suitable for consumption is discharged.

9. An apparatus for milking animals, such as cows, comprising a milking robot, a computer, a teat cup, and foremilking means for foremilking an animal's teat, said foremilking means enabling said teat cup to discharge the first few streams of foremilk into a reservoir which is separate from another reservoir into which the milk, which is subsequently received in said teat cup and which is suitable for consumption, is discharged.

10. An apparatus according to claim 9, wherein said foremilking means comprises a computer-controlled three-way cock for the selective discharge of milk to the separate reservoirs.

11. An apparatus according to claim 10, wherein said three-way cock is mounted on said teat cup.

12. An apparatus according to claim 9 wherein said foremilking means comprises two milk lines connected to said teats cup, one of said milk lines being for the discharge of foremilk into said separate reservoir.

13. An apparatus according to claim 12, comprising a holder on which said teat cup is arranged after a milking, said holder having a recess which conforms to the underside of said teat cup.

14. An apparatus according to claim 9, comprising a milking parlor for confining said animal while being milked, and a pivot mounting on an upper side of said milking parlor, wherein said teat cup is provided with milk and pulsations tubes which are connected to said milking parlor by said pivot mounting.

15. An apparatus according to claim 9, wherein said milking robot comprises two robot arms, each said robot arm including a gripper by means of which said teat cup and a further teat cup are coupled to the teats of animal to be milked.

16. An apparatus according to claim 15 wherein one of said two robot arms is disposed on each side of said milking parlor.

17. An apparatus according to claim 9, comprising a robot arm provided with a laser sensor, to determine the positions of the teats of an animal to be milked.

18. An apparatus according to claim 17, comprising a milking parlor for confining an animal to be milked, said robot arm, being disposed on a longitudinal side of said milking parlor, said robot arm being both vertically and horizontally moveable.

19. An apparatus for milking animals, such as cows, comprising a milking robot, a computer, a teat cup, and foremilking means for foremilking an animal's teat, said foremilking means enabling said teat cup to discharge the first few streams of foremilk into a reservoir which is separate from another reservoir into which the milk, which is subsequently received in said teat cup and which is suitable for consumption, is discharged, said foremilking means comprising a timing circuit which defines a time interval for obtaining the foremilk and a flow sensor, by means of which it can be established whether a few streams of foremilk have been received by said teat cup.

20. An apparatus for milking animals, such as cows, comprising a milking robot, a computer, a teat cup, and foremilking means for foremilking an animal's teat, said foremilking means enabling said teat cup to discharge the first few streams of foremilk into a reservoir which is separate from another reservoir into which the milk, which is subsequently received in said teat cup and which is suitable for consumption, is discharged, said foremilking means comprising two milk lines connected to said teat cup, one of said milk lines being for the discharge of foremilk into said separate reservoir and further comprising a holder on which said teat cup is arranged after a milking, said holder having a recess which conforms to the underside of said teat cup wherein said recess and the underside of said teat cup have matching conical shapes.

21. An apparatus for milking animals, such as cows, comprising a milking robot, a computer, a teat cup, and foremilking means for foremilking an animal's teat, said foremilking means enabling said teat cup to discharge the first few streams of foremilk into a reservoir which is separate from another reservoir into which the milk, which is subsequently received in said teat cup and which is suitable for consumption, is discharged, said foremilking means comprising two milk lines connected to said teat cup, one of said milk lines being for the discharge of foremilk into said separate reservoir, said teat cup being provided with means of transport which retains said teat cup, when being removed from said teat and moved to said holder, in an approximately upright position, said means of transport comprising two cables connected to said teat cup.

22. An apparatus according to claim 21, comprising a milking parlor for confining said animal during milking, one of said cables connected with said milking parlor and extending essentially vertically and the other of said cables extending essentially horizontally and transversely to the longitudinal direction of said milking parlor.

23. An apparatus according to claim 22, wherein said means of transport are provided with a withdrawing member disposed near the longitudinal side of said milking parlor, said withdrawing member comprising a cylinder/piston unit connected to an end of said other cable that extends essentially horizontally.

24. An apparatus according to claim 23, wherein said cylinder/piston unit is pneumatically operated.

25. An apparatus for automatically milking animals, such as cows, comprising:

a milking robot, a milking parlor, a computer, a teat cup, wherein said milking robot moves said teat cup within said milking parlor under control of said computer, milk and pulsation tubes connected to said teat cup and movable therewith, a pivot-mounting at an upper side of said milking parlor, said milk and pulsation tubes depending from said pivot-mounting, said pivot-mounting comprising a hinge, said milk and said pulsation tubes being pivoted-mounted on the milking parlour from said hinge and disposed at a certain distance from the longitudinal side of said milking parlor, said milk and said pulsation tubes being disposed in an angular configuration, said angular configuration comprising an isosceles triangle.

26. An apparatus for automatically milking animals, such as cows, comprising:

a milking robot, a milking parlor, a computer, a teat cup, wherein said milking robot moves said teat cup within said milking parlor under control of said computer, milk and pulsation tubes connected to said teat cup and movable therewith, a pivot-mounting at an upper side of said milking parlor, said milk and pulsation tubes depending from said pivot-mounting, said pivot-mounting comprising a hinge, said milk and said pulsation tubes being pivoted-mounted on the milking parlour from said hinge and disposed at a certain distance from the longitudinal side of said milking parlor, said milk and said pulsation tubes being disposed in an angular configuration, said angular configuration comprising an isosceles triangle in which said pulsation tube extends along one substantially equal leg of said isosceles triangle and said milk tube extends along the other substantially equal leg of said isosceles triangle.

27. An apparatus for milking animals, such as cows, comprising:

a milking robot, a computer, a teat cup, and foremilking means for foremilking an animal's teat, said foremilking means enabling said teat cup to discharge the first few streams of foremilk into a reservoir which is separate from another reservoir into which the milk, which is subsequently received in said teat cup and which is suitable for consumption, is discharged, and said milking robot comprising two robot arms, each said robot arm including a gripper by means of which said teat cup and a further teat cup are coupled to the teats of an animal to be milked, each said gripper being provided with a recess curved to conform with shells of said teat cup and said further teat cup, each said gripper comprising an electromagnet.

28. An apparatus for automatically milking animals, such as cows, comprising a milking robot, a milking parlor a computer, a teat cup, wherein said milking robot moves said teat cup within said milking parlor under control of said computer, milk and pulsation tubes connected to said teat cup and movable therewith, a pivot-mounting at an upper side of said milking parlor, said milk and pulsation tubes depending from said pivot-mounting.

29. An apparatus according to claim 28, wherein said pivot-mounting comprises a hinge said milk and said pulsation tubes being pivoted-mounted on the milking parlour from said hinge and disposed at a certain distance from the longitudinal side of said milking parlor.

30. An apparatus according to claim 29, wherein said milk and said pulsation tubes are disposed in an angular configuration.

* * * * *